(12) United States Patent
Singh et al.

(10) Patent No.: US 10,313,997 B2
(45) Date of Patent: Jun. 4, 2019

(54) USER EQUIPMENT REGISTRATION METHOD FOR NETWORK SLICE SELECTION AND NETWORK CONTROLLER AND NETWORK COMMUNICATION SYSTEM USING THE SAME

(71) Applicant: Industrial Technology Research Institute, Hsinchu (TW)

(72) Inventors: Shubhranshu Singh, Hsinchu (TW); Chia-Lin Lai, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 15/849,694

(22) Filed: Dec. 21, 2017

(65) Prior Publication Data

US 2018/0227871 A1 Aug. 9, 2018

Related U.S. Application Data

(60) Provisional application No. 62/455,561, filed on Feb. 6, 2017.

(51) Int. Cl.
*H04W 60/04* (2009.01)
*H04W 48/16* (2009.01)
(Continued)

(52) U.S. Cl.
CPC ............ *H04W 60/04* (2013.01); *H04W 8/12* (2013.01); *H04W 12/06* (2013.01); *H04W 48/16* (2013.01); *H04W 48/18* (2013.01); *H04W 60/00* (2013.01)

(58) Field of Classification Search
CPC .... H04W 16/02; H04W 60/04; H04W 72/048
See application file for complete search history.

(56) References Cited

U.S. PATENT DOCUMENTS 9,462,477 B2   10/2016   Ahmad et al.
2016/0156513 A1   6/2016   Zhang et al.
(Continued)

FOREIGN PATENT DOCUMENTS

CN   107040481   8/2017
TW   201717686   5/2017
(Continued)

OTHER PUBLICATIONS

Hang Zhang et al., "5G Wireless Network: MyNET and SONAC", IEEE Network, Jul.-Aug. 2015, pp. 14-23.
(Continued)

*Primary Examiner* — Myron Wyche
(74) *Attorney, Agent, or Firm* — JCIPRNET

(57) ABSTRACT

A user equipment registration method for network slice selection, and a network controller and a network communication system are provided. The method includes: receiving a registration request of a UE; in response to receiving the registration request including slice selection information, determining whether having a capability for serving the UE according to the slice selection information, so as to transmit a first network function discovery request including the slice selection information or transmit a second network function discovery request for searching a target AMF; and selecting a network function for serving the UE according to a network function discovery response to perform a registration setting operation after receiving the network function discovery response corresponding to the first network function discovery request, or transmitting an interface connection release message to an access node after receiving another network function discovery response corresponding to the second network function discovery request.

25 Claims, 10 Drawing Sheets

(51) Int. Cl.
*H04W 48/18* (2009.01)
*H04W 8/12* (2009.01)
*H04W 12/06* (2009.01)
*H04W 60/00* (2009.01)

(56) References Cited

U.S. PATENT DOCUMENTS

| | | | |
|---|---|---|---|
| 2016/0212016 A1 | 7/2016 | Vrzic et al. | |
| 2016/0353465 A1 | 12/2016 | Vrzic et al. | |
| 2016/0359682 A1 | 12/2016 | Senarath et al. | |
| 2017/0086118 A1 | 3/2017 | Vrzic | |
| 2017/0142591 A1* | 5/2017 | Vrzic | H04W 24/08 |
| 2017/0164212 A1* | 6/2017 | Opsenica | H04W 24/02 |
| 2017/0164349 A1* | 6/2017 | Zhu | H04W 28/0247 |

FOREIGN PATENT DOCUMENTS

| | | |
|---|---|---|
| TW | I596976 | 8/2017 |
| TW | 201742411 | 12/2017 |

OTHER PUBLICATIONS

3GPP, "3rd Generation Partnership Project; Technical Specification Group Services and System Aspects; System Architecture for the 5G System; Stage 2 (Release 15)", TS 23.501, V0.5.0, Jul. 2017, pp. 1-165.

3GPP, "3rd Generation Partnership Project; Technical Specification Group Services and System Aspects; Procedures for the 5G System; Stage 2 (Release 15)", TS 23.502, V0.5.0, Jul. 2017, pp. 1-148.

3GPP, "Network Slice instance selection", SA WG2 Meeting #122, Jun. 2017, pp. 1-26.

3GPP, "Removal of FFS in Section 5.15.1 of TS 23.501", SA WG2 Meeting #122, Jun. 2017, pp. 1-2.

3GPP, "Update to Section 6.5.3 AMF Selection in TS 23.501", SA WG2 Meeting #122, Jun. 2017, pp. 1-2.

"Office Action of Taiwan Counterpart Application", dated Sep. 17, 2018, p. 1-p. 19.

"Technical Specification Group Services and System Aspects; Procedures for the 5G System; Stage 2; (Release 15)," 3GPP TS 23.502, V0.1.1, Jan. 2017, pp. 1-46.

"N2 Release Procedure," LG Electronics Inc., SA WG Meeting #S2-118BIS S2-170234, Jan. 16-20, 2017, Spokane Washintion, USA, pp. 1-3.

"Technical Specification Group Services and System Aspects; System Architecture for the 5G System; Stage 2 (Release 15)," 3GPP TS 23.501 V0.1.1, Jan. 2017, pp. 1-67.

Samsung, "Baseline description for Network Function selection," 3GPP, vol. SA WG2, Jan. 10, 2017, pp. 1-4.

Huawei, et al., "Description on NF Service Discovery," 3GPP, vol. SA WG2, Jan. 23, 2017, pp. 1-3.

3GPP, "3rd Generation Partnership Project; Technical Specification Group Services and System Aspects; Study on Architecture for Next Generation System," 3GPP TR 23.799, Dec. 2016, pp. 1-527.

"Search Report of Europe Counterpart Application", dated Jun. 19, 2018, p. 1-p. 13.

\* cited by examiner

USER EQUIPMENT REGISTRATION METHOD FOR NETWORK SLICE SELECTION AND NETWORK CONTROLLER AND NETWORK COMMUNICATION SYSTEM USING THE SAME

CROSS-REFERENCE TO RELATED APPLICATION

This application claims the priority benefit of U.S. provisional application Ser. No. 62/455,561, filed on Feb. 6, 2017. The entirety of the above-mentioned patent application is hereby incorporated by reference herein and made a part of this specification.

TECHNICAL FIELD

The disclosure relates to a user equipment registration method for network slice selection, and a network controller and a network communication system using the method.

BACKGROUND

In recent trends, network slicing is a solution for supporting different service requirements in 5th generation mobile network (5G). Network operators can perform the network slicing through technologies including software-defined networking (SDN) and network function virtualization (NFV) to divide a physical network into virtual logical networks corresponding to a plurality of different application service scenarios. With use of the network slicing, 5G network can provide optimized, dynamic and flexible communication services for diversified application scenarios in the future.

A user equipment (UE) in the 5G network can access a plurality of different network slices, and these network slices can each provide different application services. As similar to existing network communication systems, the UE in the 5G network shall register to the network. That is, the UE would register to the 5G network before requesting the network slices for providing specific services. After the UE registers to 5G network, if the UE is able to immediately connect to the network slice that meets the demand, the UE can use the services provided by the 5G network as soon as possible according to its permissions. Therefore, how to instantly select the most appropriate network slice for the user equipment to match a required service type and a working state of the user equipment is indeed one of the important topics to be addressed by persons skilled in the art.

SUMMARY

In view of above, the disclosure is directed to a user equipment registration method for network slice selection, and a network controller and a network communication system using the method.

The disclosure provides a user equipment registration method for network slice selection, which is adapted to a network controller having an access and mobility management function. Said method includes, but not limited to: receiving a registration request of a user equipment, wherein the registration request includes slice selection information; in response to receiving the registration request, determining whether having a capability for serving the user equipment according to the slice selection information so as to transmit a first network function discovery request including the slice selection information or a second network function discovery request for searching a target access and mobility management function; and selecting a network function for serving the user equipment according to a network function discovery response to perform a registration setting operation with the selected network function after receiving the network function discovery response corresponding to the first network function discovery request, or transmitting an interface connection release message to an access node after receiving another network function discovery response corresponding to the second network-function discovery request.

The disclosure provides a network controller, which may be a part of a network communication system. The network controller includes, but not limited to, a transceiver and a processor. The processor is coupled to the transceiver. The processor is configured to at least perform operations of: receiving a registration request of a user equipment, wherein the registration request includes slice selection information; in response to receiving the registration request, determining whether having a capability for serving the user equipment according to the slice selection information so as to transmit a first network function discovery request including the slice selection information or a second network function discovery request for searching a target access and mobility management function; and selecting a network function for serving the user equipment according to a network function discovery response to perform a registration setting operation with the selected network function after receiving the network function discovery response corresponding to the first network function discovery request, or transmitting an interface connection release message to an access node after receiving another network-function discovery response corresponding to the second network-function discovery request.

The disclosure provides a network communication system, which includes, but not limited to: a first network controller and a second network controller. The second network controller is connected to the first network controller. The first network controller receives a registration request of a user equipment, wherein the registration request includes slice selection information. In response to receiving the registration request, the first network controller determines whether having capability for serving the user equipment according to the slice selection information, so as to transmit a first network function discovery request including the slice selection information. The second network controller receives the first network function discovery request including the slice selection information, and determines a candidate network function associated with a candidate network slice according to the slice selection information. The second network controller provides the candidate network function to the first network function by transmitting a network function discovery response corresponding to the first network function discovery request. The first network controller selects a network function for serving the user equipment according to the network function discovery response to perform a registration setting operation with the selected network function after the network function discovery response corresponding to the first network function discovery request is received by the first network controller.

To make the above features and advantages of the disclosure more comprehensible, several embodiments accompanied with drawings are described in detail as follows.

DETAILED DESCRIPTION

Some embodiments of the disclosure are described in details below with reference to the accompanying drawings, and as for reference numbers cited in the following description, the same reference numbers in difference drawings are referring to the same or like parts. The embodiments are merely a part of the disclosure rather than disclosing all possible embodiments of the disclosure. In fact, each of the embodiments in the disclosure may be implemented in many different forms, and should not be construed as limited by the embodiments set forth in the disclosure.

For the definition of the term "network slice" in the embodiments of the disclosure, for example, reference may be made to the "3GPP TS 23.501" specification. The network slice is a logical network that can provide specific network capabilities and network characteristics, and a network slice system can select a suitable network slice based on a service type requested by the UE. For 5G network, the network slice may be regarded as the logical network formed by a group of network functions (NFs) in 5G network.

For the definition of the term "network function" in the embodiments of the disclosure, for example, reference may be made to the "3GPP TS 23.501" specification. For example, the network function may include (but not limited to) a network element on a dedicated hardware, a software instance running on a dedicated hardware, or a virtualised function instantiated on an appropriate platform (e.g., a cloud infrastructure).

Figure 1:
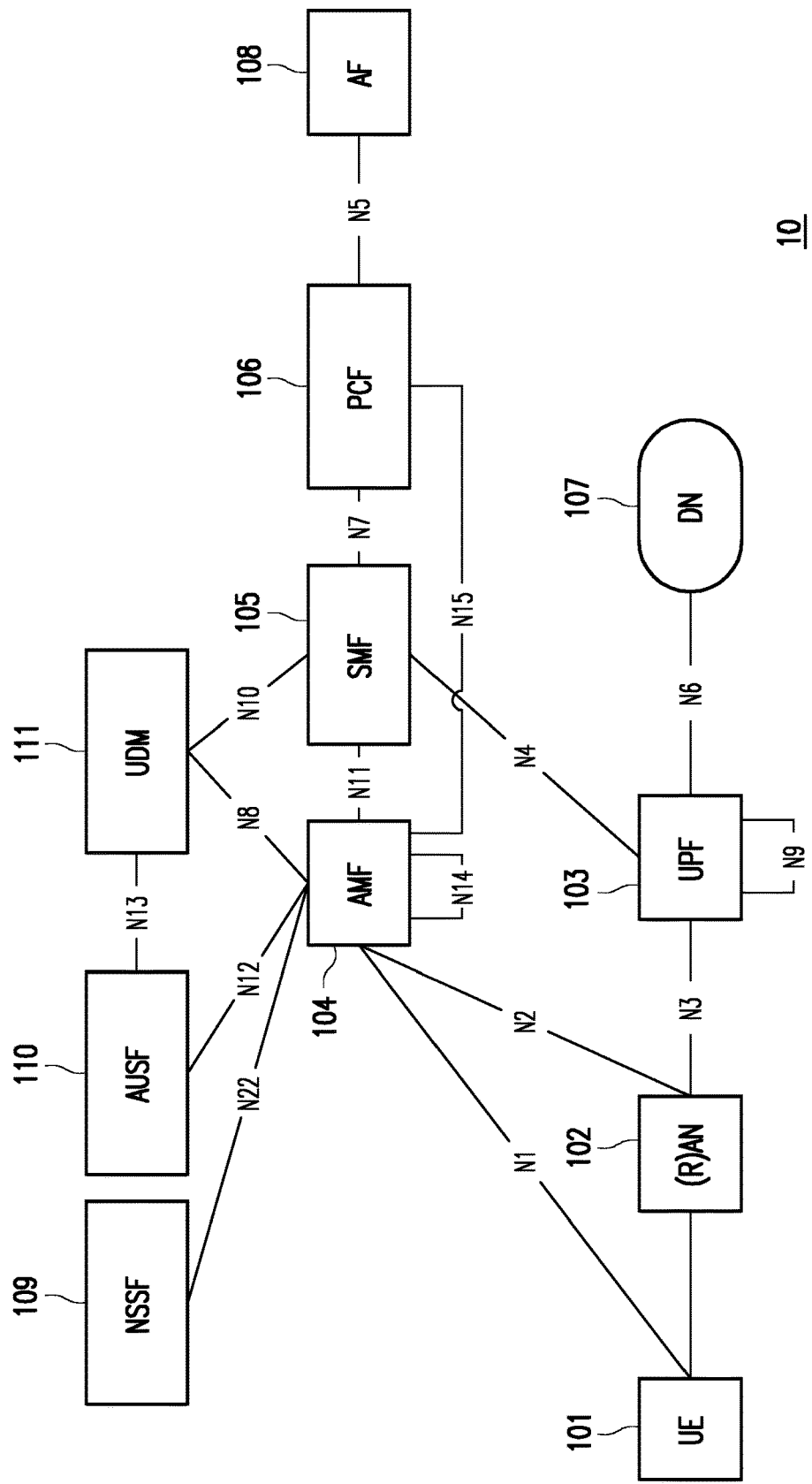
FIG. 1 is a point-to-point architecture of 5G network.
Figure 2:
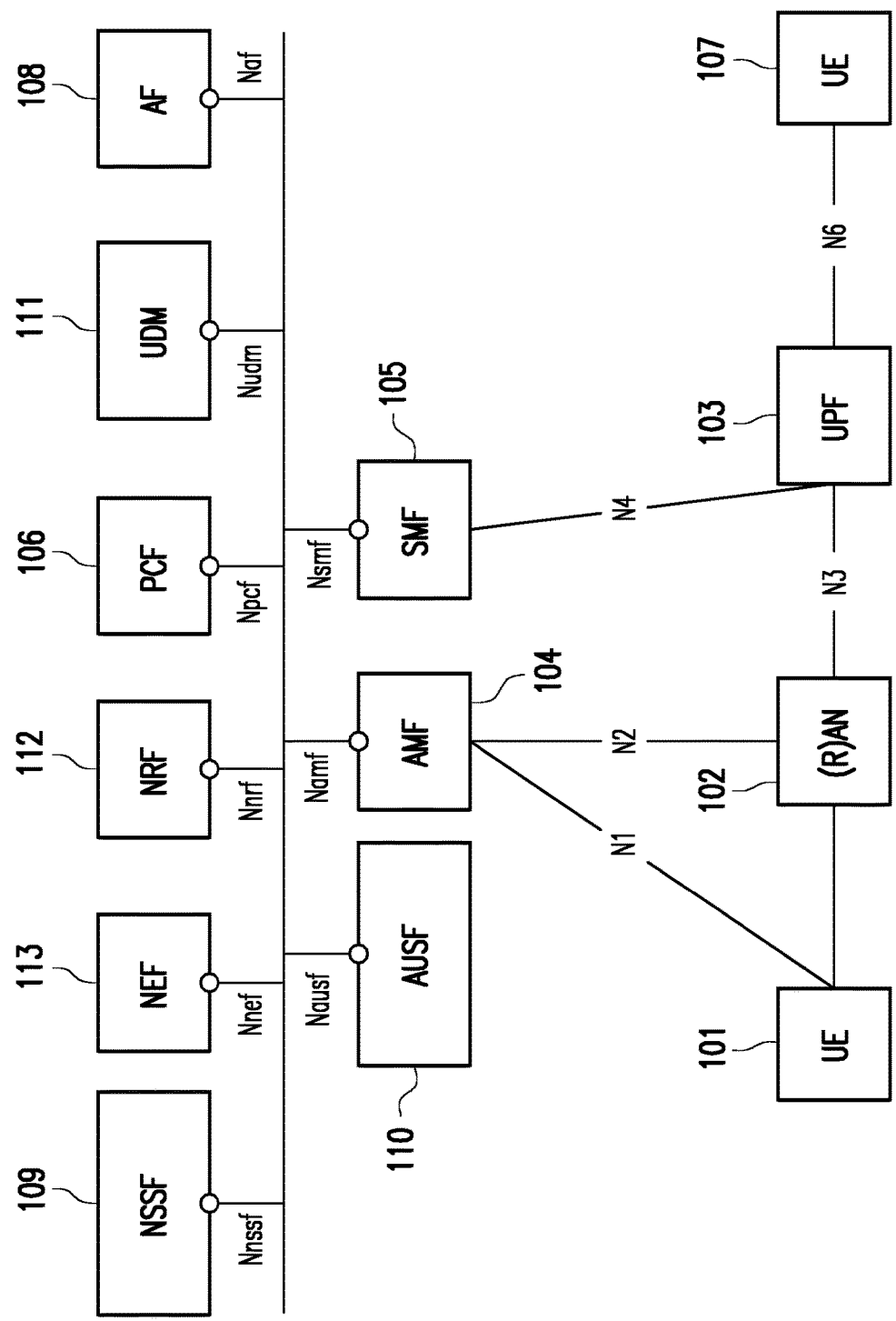
FIG. 2 is a service-based architecture of 5G network.

FIG. 1 and FIG. 2 respectively illustrate two different architectures of 5G network. FIG. 1 is a point-to-point architecture of 5G network, and FIG. 2 is a service-based architecture of 5G network. With reference to FIG. 1 and FIG. 2, network entities and network functions in a point-to-point architecture 10 and a service-based architecture 20 may include: A user equipment (UE) 101, a (radio)access network ((R)AN) 102, a user plane function (UPF) 103, an access and mobility management function (AMF) 104, a session management function (SMF) 105, a policy control function (PCF) 106, a data network (DN) 107, an application function (AF) 108, a network slice selection function (NSSF) 109, an authentication server function (AUSF) 110, a unified data management (UDM) 111, a network function (NF) repository function (NRF) 112 and a network exposure function (NEF) 113. The UE 101 may be connected to the (R)AN 102 and served by the network functions responsible for different professional services in 5G network in order to communicate with other devices in the DN 107. Basic specification and definition of 5G network may refer to "3GPP TS 23.501".

With reference to FIG. 1, FIG. 1 illustrates the point-to-point architecture 10 in non-roaming situation. The point-to-point architecture 10 shows interface interactions existing between the NF services of the network functions, and the interface interaction between two network functions is defined based on a point-to-point reference point (e.g., an N11 reference point between the AMF 104 and the SMF 105). With reference to FIG. 2, FIG. 2 illustrates the service-based architecture 20 in non-roaming situation. The network functions on a control plane in the service-based architecture 20 can access services of other network functions on the control plane through service-based interfaces. For example, the AMF 104 can enable other authorized network functions for accessing the service provided by the AMF 104 through a service interface Namf. When various system procedures are being performed, interactions and message passing between the network functions may refer to the "3GPP TS 23.501" V0.1.1 and "3GPP TS 23.502 V0.1.1" specification.

The network slice may be regarded as the logical network constructed by those network functions described above. Different types of network slices support different service requirements. Therefore, the user equipment needs to be connected to the network slice that meets the service requirement in order to obtain a suitable 5G network service. After the network slice is selected in response to the service requirement, the network function corresponding to the selected network slice may also be determined accordingly.

In the embodiments of the disclosure, the term "user equipment (UE)" may represent various embodiments, which may include (but not limited to), for example, a mobile station, an advanced mobile station (AMS), a server, a user terminal, a desktop computer, a laptop computer, a network computer, a workstation, a personal digital assistant (PDA), a personal computer (PC), a scanner, a phone device, a pager, a camera, a television, a handheld video game console, a music device, a wireless sensor and the like. In certain applications, the UE may be a fixed computer device operated in a mobile environment including bus, train, airplane, boat, car, etc.

In an embodiment of the disclosure, a (radio) access network ((R)AN) (e.g., the (R)AN 102 in FIG. 1 and FIG. 2) between a core network (CN) and the UE in 5G network includes at least one access node, and the UE may be connected to the access node in the (R)AN in wired or wireless manners to obtain the 5G network service. For instance, the (R)AN of 5G network may include a next generation radio access node (NG-RAN node) such as a next generation access node B (gNodeB or gNB). Alternatively, the (R)AN of 5G network may also include a home evolved node B (HeNB), an evolved node B (eNB) or a non 3GPP access point, etc.

Figure 3:
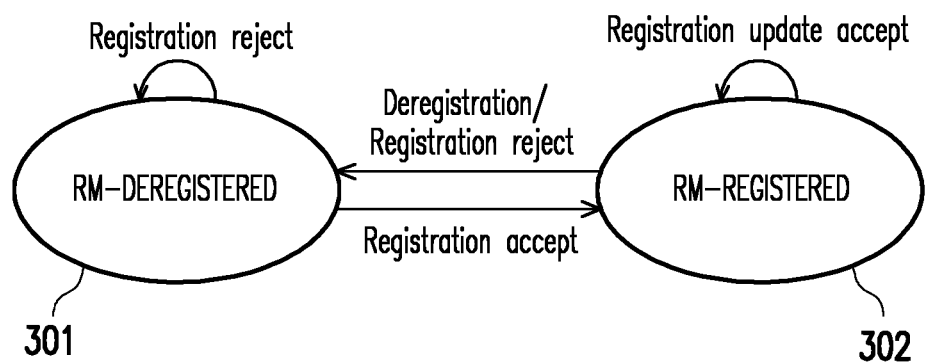
FIG. 3 is a registration management state model in a UE.

FIG. 3 is a registration management state model in a UE. With reference to FIG. 3, the UE is able to switch between a registration management-deregistered (RM-DEREGISTERED) state 301 and a registration management-registered (RM-REGISTERED) state 302. When the UE is in the RM-DEREGISTERED state 301, the UE may perform the following operations. When the UE is in the RM-DEREG- ISTERED state 301, if the UE intends to obtain a registration limited service, the UE may attempt to register to a public land mobile network (PLMN) through an initial registration procedure. When the UE is in the RM-DEREGISTERED state 301, if the UE receives a registration rejected message of the initial registration procedure, the UE then remains in the RM-DEREGISTERED state 301. When the UE is in the RM-DEREGISTERED state 301, if the UE receives a registration accept message of the initial registration procedure, the UE then enters the RM-REGISTERED state 302 from the RM-DEREGISTERED state 301.

On the other hand, when the UE is in the RM-REGISTERED state 302, the UE may perform the following operations. When the UE is in the RM-REGISTERED state 302, if a tracking area identity (TAI) of a service cell is currently not shown in a TAI list stored by the UE, the UE then performs a mobility registration procedure (or referred to as a mobility registration update procedure). When the UE is in the RM-REGISTERED state 302, the UE may also perform a periodic or non-periodic registration update procedure to inform the network that the UE is still active or has certain protocol parameters to be re-negotiated with the network. When the UE is in the RM-REGISTERED state 302, the UE can enter the RM-DEREGISTERED state 301 from the RM-REGISTERED state 302 by performing a deregistration procedure, or can enter the RM-DEREGISTERED state 301 from the RM-REGISTERED state 302 in response to the registration reject message or a deregistration message being received.

In an embodiment of the disclosure, a registration procedure for assisting the UE to select/re-select the network slice is proposed. In other words, the registration procedure for registering to 5G network may be used for assisting the UE to select the suitable network slice. In an embodiment of the disclosure, the registration procedure for assisting the UE to select/re-select the network slice may include the initial registration procedure performed when the UE is in the RM-DEREGISTERED state (e.g., when the UE is just powered on), or a mobility registration procedure performed when the UE moves to a different tracking area (TA).

In an embodiment of the disclosure, a network communication system (e.g., of a 5G network system) at least includes a first network controller having a first network function and a second network controller having a second network function. The second network function on the second network controller may be connected to the first network function of the first network controller through a software-defined interface or a physical interface. The first network function receives a registration request of a UE, wherein the registration request includes slice selection information. In response to receiving the registration request of the UE, the first network function determines whether having capability for serving the UE according to the slice selection information, so as to transmit a first network function discovery request including the slice selection information. The second network function receives the first network function discovery request including the slice selection information, and determines a candidate network function associated with a candidate network slice according to the slice selection information. The second network function provides the candidate network function to the first network function by transmitting a network function discovery response corresponding to the first network function discovery request. After the network function discovery response corresponding to the first network function discovery request is received by the first network controller, the first network function selects a network function for serving the UE according to the network function discovery response to perform a registration setting operation with the selected network function. In this way, the network communication system of an embodiment of the disclosure can select the network slice suitable for the UE during the registration procedure of the UE.

To describe the embodiment of the disclosure more clearly, the 5G network architecture 20 of FIG. 2 is taken as an example for introducing various network functions involved in the registration procedure. In an embodiment of the disclosure, aforesaid first network function for receiving the registration request may be the AMF (access and mobility function) 104. The AMF 104 may be a termination of a RAN control plane (CP) interface and a non-access stratum message (NAS message), and the AMF 104 may be responsible for a registration management, a connection management and a mobility management related to the UE. In addition, the AMF 104 is also responsible for an access authentication and an access authorization related to the UE. In an embodiment, the AMF 104 may be a network controller having an access and mobility management function.

In an embodiment of the disclosure, aforesaid second network function may be the NRF 112. The NRF 112 can support a service discovery function, and provide information regarding a discovered network function (be discovered) to other network functions in response to the NF discovery requests received from the other network functions. In addition, the NRF 112 may maintain a network function profile (NF profile) of a network function instance and the service supported by the network function instance. In an embodiment, the NRF 112 may be a network controller having the service discovery function.

In an embodiment of the disclosure, the SMF 105 may be responsible for certain settings of a user plane, as well as establishment, modification and release of a packet data unit (PDU) session between the UPF 103 and RAN node (e.g., determining a routing path for packets). The UPF 103 may be responsible for routing and forwarding of packets, and is a positioning anchor point for processing Intra-/Inter-RAT mobility in a wireless access technology as well as a PDU session point for interconnecting to the DN 107. In an embodiment, the SMF 105 may be a network controller having the session management function, and the UPF 103 may be a network controller having the user plane function.

In an embodiment of the disclosure, the PCF 106 can support a unified policy framework to govern network behavior and provides policy rules to be followed by the network functions on the control plane. The AUSF 110 may be used to verify whether the UE is a legal service requester, and supports an authentication server function established by SA WG3 work group. The UDM 111 can support an authentication credential repository and processing function, and can store long-term security credentials used in authentication for an authentication and key agreement (AKA). That is to say, the UDM 111 may be used to store authentication data related to the UE. In an embodiment, the PCF 106 may be a network controller having the policy management function, and the UDM 111 may be a network controller having the unified data management function.

Figure 4:
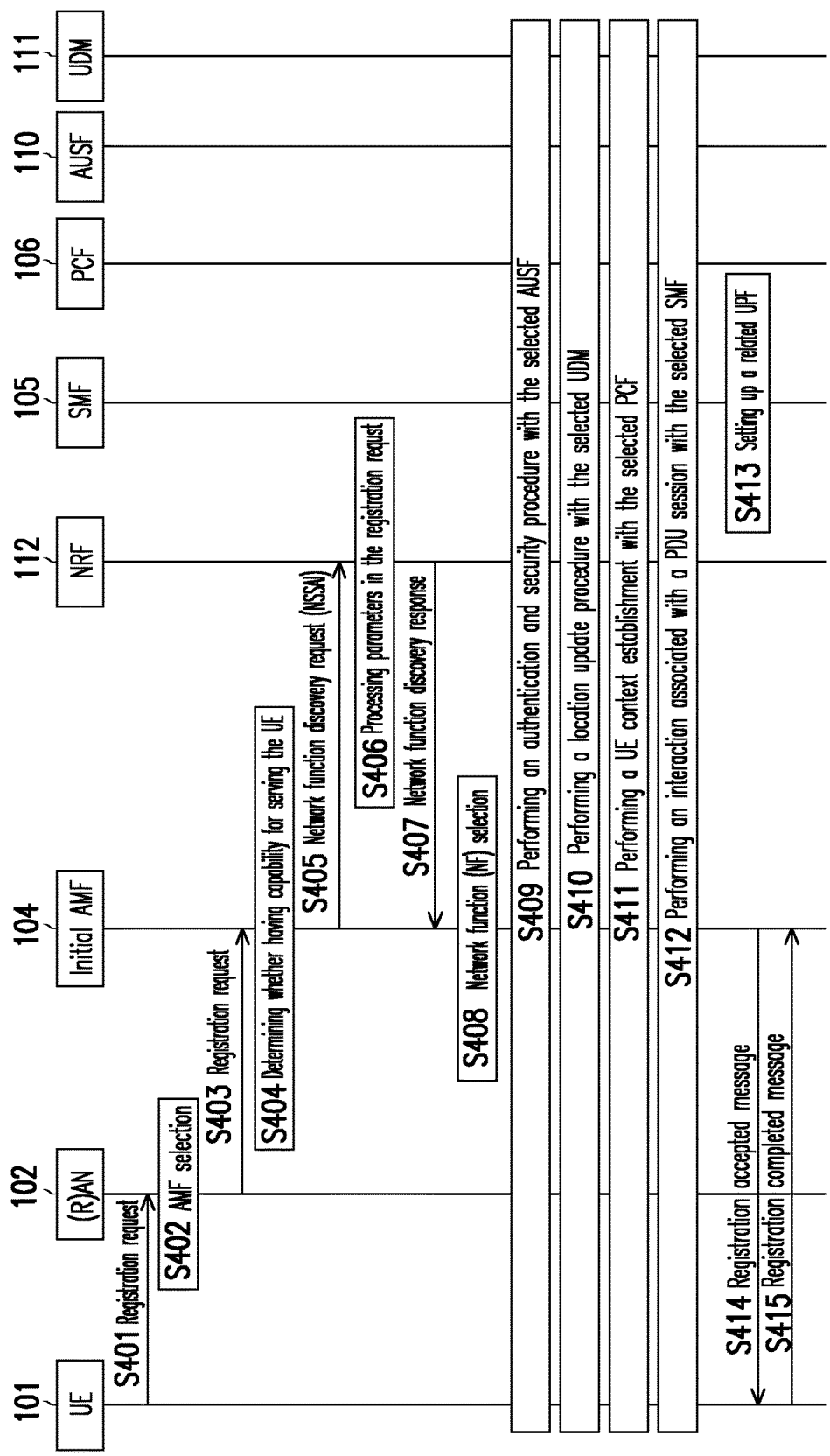
FIG. 4 is a schematic diagram illustrating a user equipment registration method without involving an AMF re-allocation according to an embodiment of the disclosure.

FIG. 4 is a schematic diagram illustrating the user equipment registration method according to an embodiment of the disclosure. An exemplary example of FIG. 4 is described using the initial registration procedure, but the disclosure is not limited thereto. With reference to FIG. 4, in step S401, the UE 101 transmits a registration request and access node parameters to the (R)AN 102, and the registration request includes slice selection information. The slice selection information may be network slice selection assistance information (NSSAI). Here, the (R)AN 102 for receiving the registration request may be regarded as an access node in an access network.

In an embodiment of the disclosure, aforesaid registration request may further include a registration type, a subscriber permanent identifier (SUPI), a temporary user ID (e.g., a 5G-globally unique temporary ID (5G-GUTI)), security parameters, a last visited TAI, a PDU session status, etc. In addition, said certain access node parameters related to the RAN (e.g., a selected PLMN ID, a cell ID, location information or a RAT type, etc.) may also be transmitted together with the registration request to the (R)AN 102. It should be noted that, the registration type in the registration request may be used to indicate what performed by the UE is the initial registration procedure, the mobility registration procedure or the periodic registration procedure.

In an embodiment of the disclosure, the network slice selection assistance information (NSSAI) may be used to identify the network slice. The network slice selection assistance information may include, for example, a slice/service type (SST) and a slice differentiator (SD). The slice/service type is used to indicate a type of the network slice that the UE intends to connect to, and the slice differentiator may be further used to differentiate the network slices of the same slice/service type. Table 1 is an example of a correspondence relation of different slice/service types to an SST indicated value.

TABLE 1

| Slice/Service type | SST indicated value | Feature |
| --- | --- | --- |
| enhance Mobile Broadband (eMBB) | 1 | Slice suitable for processing 5G eMBB |
| Ultra-Reliable Low Latency Communication (URLLC) | 2 | Slice suitable for processing URLLC |
| massive Internet of Things (mIoT) | 3 | Slice suitable for processing mIoT |

In response to receiving the registration request transmitted by the UE 101, the (R)AN 102 performs an AMF selection in step S402. Afterwards, in step S403, the (R)AN 102 transmits the registration request of the UE 101 to the initial AMF 104. In an embodiment of the disclosure, the (R)AN 102 may select a suitable AMF according to the NSSAI in the registration request. If the (R)AN 102 is unable to select the suitable AMF based on the NSSAI provided by the UE 101, the (R)AN 102 may forward the message transmitted by the UE 101 (i.e., the registration request) to a predetermined AMF. Said predetermined AMF may be a configured AMF having an AMF selection function.

Next, in response to receiving the registration request by the initial AMF 104, the initial AMF 104 determines whether having capability for serving the UE 101 in step S404. In an embodiment of the disclosure, when the registration request is received by the initial AMF 104 determined by the (R)AN 102, the initial AMF 104 may inquire the UDM 111 about subscription information related to the UE. Afterwards, by checking the NSSAI provided by the UE 101 and the subscription information related to the UE, the initial AMF 104 can confirm whether the initial AMF 104 itself is qualified for serving the UE 101.

In a process example of FIG. 4, it is assumed that the initial AMF 104 confirms that the initial AMF 104 itself has the capability for serving the UE 101 in step S404. Under this premise, in step S405, the initial AMF 104 transmits a network function discovery request to the NRF 112, and the network function discovery request may include the NSSAI and other registration related information. In an embodiment of the disclosure, the initial AMF 104 may utilize a network function discovery service (Nnrf NF discovery service) provided by the NRF 112 via an Nnrf interface to transmit the network function discovery request with the NSSAI to the NRF 112. Here, the Nnrf interface is a service-based interface exhibited by NRF 112 for transceiving messages, which can allow other network functions to access the function provided by the NRF 112 via the Nnrf interface (e.g., as shown in FIG. 2).

In response to the network function discovery request received by the NRF 112, in step S406, the NRF 112 processes parameters in the registration request, and determines at least one candidate network function associated with at least one candidate network slice according to the NSSAI and other registration information in the registration request. Next, in step S407, the NRF 112 provides the candidate network function to the initial AMF 104 by transmitting a network function discovery response corresponding to the network function discovery request.

In an embodiment of the disclosure, the NRF 112 may obtain certain network slice information according to the NSSAI and the other information in the registration request, such as a slice type, a slice ID of the candidate network slice, or a candidate SMF, a candidate PCF, a candidate UDM associated with the candidate network slice, etc. In other words, the NRF 112 may realize a function of selecting the network slice satisfying the demand of the UE according to the NSSAI in the registration request. After the candidate network function is determined by the NRF 112, the NRF 112 transmits the network function discovery response of the network function discovery request to the initial AMF 104. At the time, the network function discovery response transmitted by the NRF 112 may include address information of the at least one candidate network function of the candidate network slice. For instance, the network function discovery response transmitted by the NRF 112 may include an IP address or a fully qualified domain name (FQDN) of the candidate network function.

Specifically, the NRF 112 may maintain the NF profile for each network function instance, and the NF profile of one network function instance may include an NF instance ID, an NF type, the PLMN ID, network slice related ID(s), the FQDN or the IP address, NF capacity information, NF specific service authorization information, names of supported services, etc. Accordingly, after the candidate network slice is determined by the NRF 112 according to the NSSAI, the NRF 112 may select one or more candidate network functions related to one or more candidate network slices according to the NF profiles. Next, the NRF 112 may obtain the FQDNs or the IP addresses of the candidate network functions according to the NF profile corresponding to the candidate network functions, and then transmit the FQDNs or the IP addresses of the candidate network functions back to the initial AMF 104.

After receiving the network function discovery response corresponding to the network function discovery request, the initial AMF 104 selects one or more network functions for serving the UE 101 according to the network function discovery response in step S408. In an embodiment of the disclosure, by receiving the network function discovery response for providing the candidate network functions, the initial AMF 104 may select the network functions for serving the UE 101 from the candidate network functions according to, for example, information including related information of the UE 101, a related ID of a network where the UE 101 is located, local operator policies, etc. For instance, the NRF 112 may provide address information of a plurality of candidate AUSFs to the initial AMF 104, and the initial AMF 104 may select the AUSF 110 for serving the UE 101 according to the SUPI of the UE 101.

In the exemplary embodiment of FIG. 4, the network functions for serving the UE 101 as selected by the initial AMF 104 may include the AUSF 110, the UDM 111, the PCF 106 and the SMF 105. Afterwards, in steps S409 to S412, the initial AMF 104 may perform a registration setting operation with each of the network functions selected by the initial AMF 104.

In step S409, the initial AMF 104 may perform an authentication and security procedure with the selected AUSF 110. In step S410, the initial AMF 104 may perform a location update procedure with the selected UDM 111. In step S411, the initial AMF 104 may assist the selected PCF 106 to perform a UE context establishment. In step S412, the initial AMF 104 may perform a setting procedure related to a PDU status with the selected SMF 105.

In the registration procedure according to the embodiment of the disclosure, the implementation of step S413 is optional. When the UE 101 provides service request information accompanying the registration request, the SMF 105 may set up a related UPF in step S413. Otherwise, step S413 may be omitted. In other words, when the UE 101 does provide related information of the service request, the selected SMF 105 may perform a related configuration for a packet routing path according the related information of the service request, so as to perform a related setting with the related UPF.

Next, in step S414, the initial AMF 104 transmits a registration accept message to the UE 101. In step S415, the UE 101 transmits a registration complete message to the initial AMF 104. In an embodiment of the disclosure, when the registration of the UE 101 is accepted, the registration accept message transmitted by the initial AMF 104 may include the temporary user ID, a registration area, a mobility limitation, the PDU session state, the NSSAI, a periodic registration update counter, etc. In response to the received registration accept message, the UE 101 may transmit the registration complete message back to the initial AMF 104 so as to confirm that one temporary user ID (e.g., 5G-GUTI) has been assigned.

The situation involving the AMF re-allocation is described below with reference to other embodiments.

Figure 5:
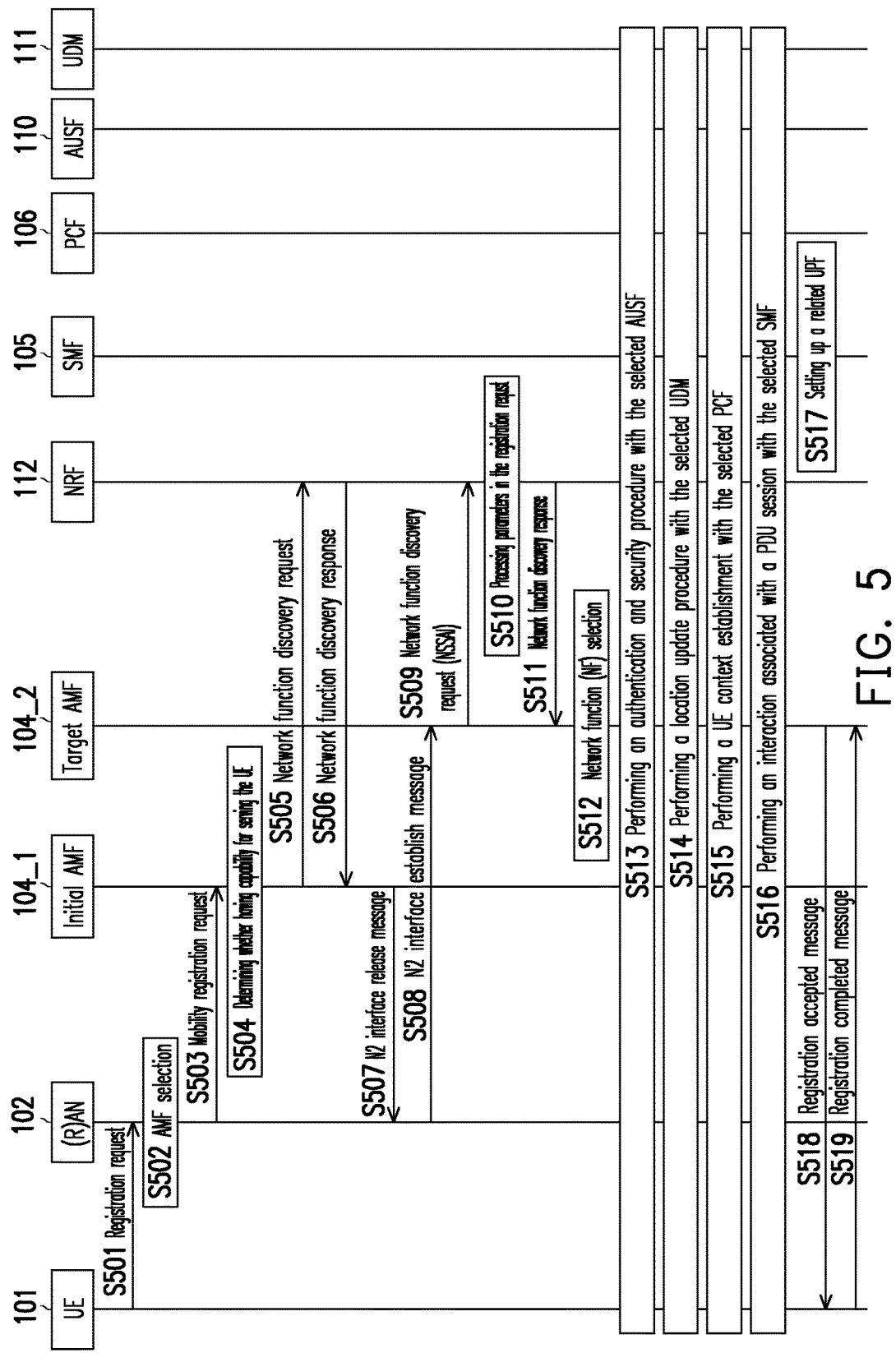
FIG. 5 is a schematic diagram illustrating the user equipment registration method involving the AMF re-allocation according to an embodiment of the disclosure.

FIG. 5 is a schematic diagram illustrating the user equipment registration method involving the AMF re-allocation according to an embodiment of the disclosure. An exemplary example of FIG. 5 is described using the initial registration procedure, but the disclosure is not limited thereto.

With reference to FIG. 5, in step S501, the UE 101 transmits a registration request and access node parameters to the (R)AN 102, and the registration request includes network slice selection assistance information (NSSAI). Here, the (R)AN 102 for receiving the registration request may be regarded as an access node in an access network. In response to receiving the registration request transmitted by the UE 101, the (R)AN 102 performs an AMF selection in step S502. Afterwards, in step S503, the (R)AN 102 transmits the registration request of the UE 101 to the initial AMF 104_1. In response to the registration request received by the initial AMF 104_1, the initial AMF 104_1 determines whether having capability for serving the UE 101 in step S504. That is, the initial AMF 104_1 may confirm whether the initial AMF 104_1 itself is suitable for serving the UE 101 through inquiries to the UDM 111. Detailed operations of step S501 to S504 are similar to detailed operations of step S401 to S404, which are not repeated hereinafter.

In a process example of FIG. 5, it is assumed that the initial AMF 104_1 confirms that the initial AMF 104_1 itself does not have the capability for serving the UE 101 in step S504. Under this premise, an AMF re-allocation procedure is triggered for execution.

If the initial AMF 104_1 determines that the initial AMF 104_1 itself does not have the capability for serving the UE 101, in step S505, the initial AMF 104_1 transmits a network function discovery request for searching a target AMF to the NRF 112, and the network function discovery request includes information for reselecting the AMF. Next, in step S506, the NRF 112 transmits a network function discovery response corresponding to the network function discovery request back to the initial AMF 104_1, and the network function discovery response includes information of a target AMF 104_2. In an embodiment of the disclosure, the information for re-selecting the AMF in the network function discovery request may include, for example, the NF type set to the AMF and a group of the candidate AMFs. According to the group of the candidate AMFs in the network function discovery request, the NRF 112 provides the related information of the candidate AMFs to the initial AMF 104_1 by utilizing the network function discovery response.

In the exemplary example of FIG. 5, the target AMF 104_2 is determined by the AMF 104_1. Therefore, in step S507, the initial AMF 104_1 transmits an N2 interface release message and information regarding the target AMF 104_2 to the (R)AN 102. In other words, after the related information of the candidate AMFs is received by the (R)AN 102, the (R)AN 102 may determine and select the target AMF 104_2 from the candidate AMFs. Next, in step S508, the (R)AN 102 establishes the N2 interface connection with the target AMF 104_2, and transmits the registration request of the UE 101 to the target AMF 104_2. In other words, in response to receiving the network function discovery response including the information for re-selecting the AMF, the initial AMF 104_1 transmits an interface connection release message and the information regarding the target AMF 104_2 to an access node in the (R)AN 102 such that the access node in the (R)AN 102 is triggered to transmit the registration request sent by the UE 101 including the slice selection information to the target AMF 104_2.

Next, in response to receiving the registration request including the NSSAI, in step S509, the target AMF 104_2 transmits the network function discovery request to the NRF 112, and the network function discovery request includes the NSSAI and other registration related information. In step S510, the NRF 112 processes parameters in the registration request, and determines at least one candidate network function associated with at least one candidate network slice according to the NSSAI and the other registration information in the registration request. In step S511, the NRF 112 may provide the candidate network function to the target AMF 104_2 by transmitting a network function discovery response corresponding to the network function discovery request. In step S512, the target AMF 104_2 selects one or more network functions for serving the UE 101 according to the network function discovery response.

In the exemplary embodiment of FIG. 5, the network function for serving the UE 101 as selected by the target AMF 104_2 may include the AUSF 110, the UDM 111, the PCF 106 and the SMF 105. Afterwards, in steps S513 to S516, the target AMF 104_2 performs a registration setting operation with each network function selected by the target AMF 104_2. In step S513, the target AMF 104_2 may perform an authentication and security procedure with the selected AUSF 110. In step S514, the target AMF 104_2 may perform a location update procedure with the selected UDM 111. In step S515, the target AMF 104_2 may assist the selected PCF 106 to perform a UE context establishment. In step S516, the target AMF 104_2 may perform a setting procedure related to a PDU status with the selected SMF 105.

When the UE 101 provides service request information accompanying the registration request, the SMF 105 may set up related UPF(s) in step S517. Next, in step S518, the target AMF 104_2 transmits a registration accept message to the UE 101. In step S519, the UE 101 transmits a registration complete message to the target AMF 104_2. Detailed operations of steps S509 to S519 executed by the target AMF 104_2 in FIG. 5 are similar to detailed operations of steps S405 to S415 executed by the initial AMF 104 in FIG. 4, which are not repeated hereinafter.

Figure 6:
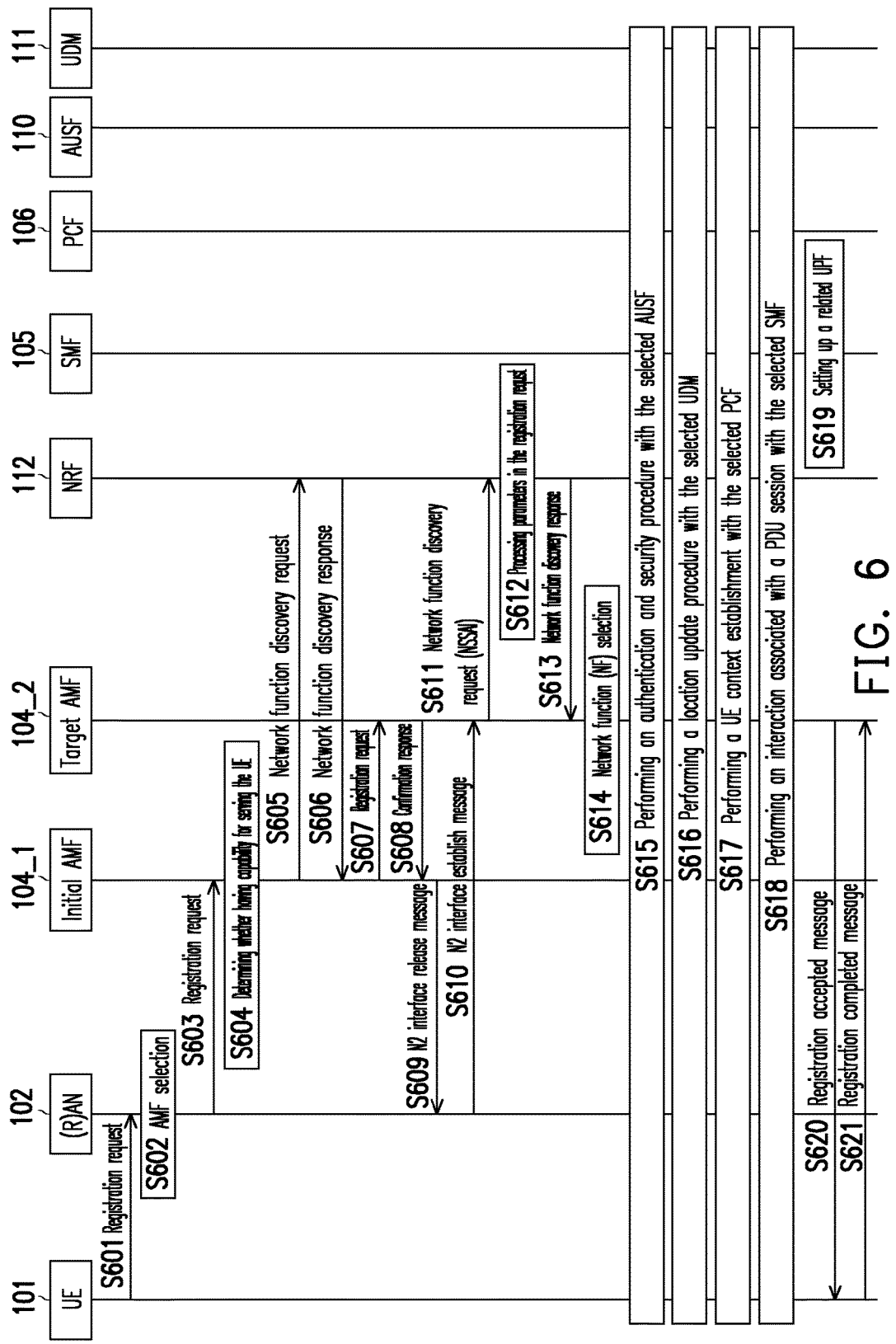
FIG. 6 is a schematic diagram illustrating the user equipment registration method involving the AMF re-allocation according to an embodiment of the disclosure.

The situation involving the AMF re-allocation is described below with reference to other embodiments. FIG. 6 is a schematic diagram illustrating the user equipment registration method involving the AMF re-allocation according to an embodiment of the disclosure. An exemplary example of FIG. 6 is described using the initial registration procedure, but the disclosure is not limited thereto. In the embodiment shown by FIG. 6, the target AMF is determined by the initial AMF that receives the registration request.

With reference to FIG. 6, in step S601, the UE 101 transmits a registration request and access node parameters to the (R)AN 102, and the registration request includes network slice selection assistance information (NSSAI). Here, the (R)AN 102 for receiving the registration request may be regarded as an access node in an access network. In response to receiving the registration request transmitted by the UE 101, the (R)AN 102 performs an AMF selection in step S602. Afterwards, in step S603, the (R)AN 102 transmits the registration request of the UE 101 to the initial AMF 104_1. In response to the registration request received by the initial AMF 104_1, the initial AMF 104_1 determines whether having capability for serving the UE 101 in step S604. That is, the initial AMF 104_1 may confirm whether the initial AMF 104_1 itself is suitable for serving the UE 101 through inquiries to the UDM 111. Detailed operations of step S601 to S604 are similar to detailed operations of step S401 to S404, which are not repeated hereinafter.

It should be noted that, in a process example of FIG. 6, it is assumed that the initial AMF 104_1 confirms that the initial AMF 104_1 itself does not have the capability for serving the UE 101 in step S604. Under this premise, an AMF re-allocation procedure is triggered for execution.

If the initial AMF 104_1 determines that the initial AMF 104_1 itself does not have the capability for serving the UE 101, in step S605, the initial AMF 104_1 transmits a network function discovery request for searching a target AMF to the NRF 112, and the network function discovery request includes information for re-selecting the AMF. Next, in step S606, the NRF 112 transmits a network function discovery response corresponding to the network function discovery request back to the initial AMF 104_1, and the network function discovery response includes information of the target AMF 104_2. In an embodiment of the disclosure, the information for re-selecting the AMF in the network function discovery request may include, for example, the NF type set to the AMF and a group of the candidate AMFs. According to the group of the candidate AMFs in the network function discovery request, the NRF 112 provides the related information of the candidate AMFs to the initial AMF 104_1 by utilizing the network function discovery response.

In the exemplary example of FIG. 6, the initial AMF 104_1 determines the target AMF 104_2 and directly reroutes the registration request of the UE 101 to the target AMF 104_2. Specifically, according to the related information of the candidate AMFs in the network function discovery response, the initial AMF 104_1 may determine the target AMF 104_2 from the candidate AMFs. Therefore, after the initial AMF 104_1 receives the network function discovery response including the related information of the candidate AMFs and accordingly determines the target AMF 104_2, in step S607, the initial AMF 104_1 forwards the registration request including the slice selection information (NSSAI) to the target AMF 104_2. When the registration request is received by the target AMF 104_2, the target AMF 104_2 transmits a confirmation response to the initial AMF 104_1 in step S608. Accordingly, in step S609, the initial AMF 104_1 transmits an N2 interface release message to the (R)AN 102, so as to release resources between the (R)AN 102 and the initial AMF 104_1. In step S610, the (R)AN 102 transmits an N2 interface establish message to establish an N2 interface connection between the target AMF 104_2 and the (R)AN 102.

After the target AMF 104_2 confirms that the target AMF 104_2 itself has the capability for serving the UE 101, in step S611, the target AMF 104_2 transmits a network function discovery request to the NRF 112, and the network function discovery request includes the NSSAI and other registration related information. In step S612, the NRF 112 processes parameters in the registration request, and determines at least one candidate network function associated with at least one candidate network slice according to the NSSAI and the other registration information in the registration request. In step S613, the NRF 112 may provide the candidate network function to the target AMF 104_2 by transmitting a network function discovery response corresponding to the network function discovery request. In step S614, the target AMF 104_2 selects one or more network functions for serving the UE 101 according the network function discovery response.

In the exemplary embodiment of FIG. 6, the network function for serving the UE 101 as selected by the target AMF 104_2 may include the AUSF 110, the UDM 111, the PCF 106 and the SMF 105. Afterwards, in steps S615 to S618, the target AMF 104_2 may perform a registration setting operation with each network function selected by the target AMF 104_2. When the UE 101 provides service request information accompanying the registration request, the SMF 105 may set up a related UPF in step S619. In step S620, the target AMF 104_2 transmits a registration accept message to the UE 101. In step S621, the UE 101 transmits a registration complete message to the target AMF 104_2. Detailed operations of steps S611 to S621 executed by the target AMF 104_2 in FIG. 6 are similar to detailed operations of steps S405 to S415 executed by the initial AMF 104 in FIG. 4, which are not repeated hereinafter.

Figure 7:
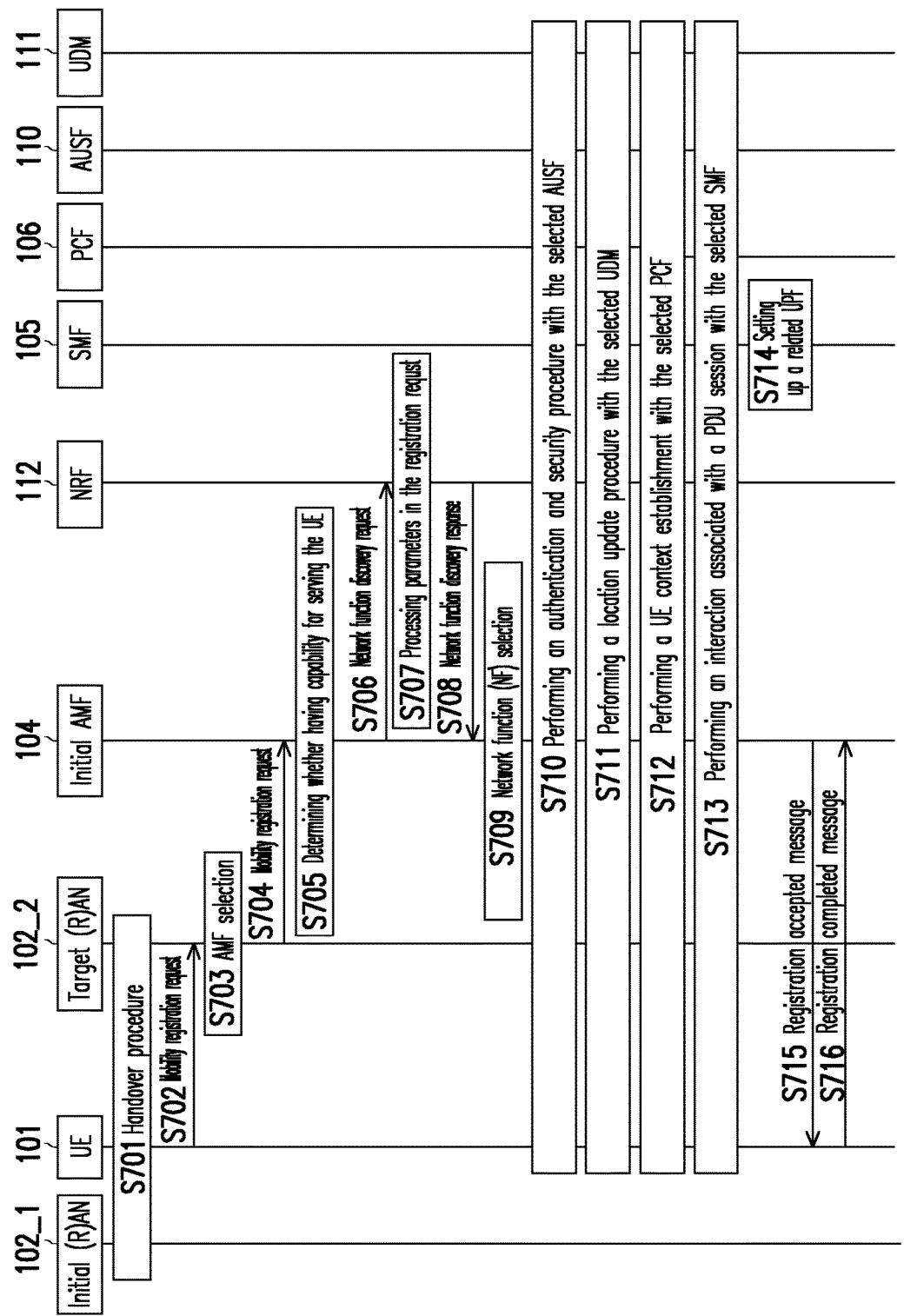
FIG. 7 is a schematic diagram illustrating the user equipment registration method related to a mobility registration according to an embodiment of the disclosure.

FIG. 4 to FIG. 6 are described using the initial registration procedure performed by the UE 101 for example. The situation regarding the mobility registration procedure performed by the UE 101 is described below with reference to other embodiments. FIG. 7 is a schematic diagram illustrating the user equipment registration method related to a mobility registration according to an embodiment of the disclosure. An exemplary example of FIG. 7 is described using the mobility registration procedure, but the disclosure is not limited thereto.

A tracking area (TA) is used to track a nearby location of a UE served by the network. Each tracking area has a unique global identity, and the unique global identity is the tracking area identity (TAI). The network side usually assigns a TAI list to the UE, and the TAI list has one or more tracking areas. When the network side intends to contact the UE, the network side may attempt to call/page the tracking areas in the TAI list so the UE can be positioned without calling every exciting and possible cells.

With reference to FIG. 7, in step S701, a handover procedure is performed with an initial (R)AN 102_1 and a target (R)AN 102_2 by the UE 101 due to movement of the UE. Here, the initial (R)AN 102_1 and the target (R)AN 102_2 may be regarded as different access points in an access network. In general, the initial (R)AN 102_1 may determine whether to activate the handover procedure according to a measurement report of a reference signal. If it is selected to activate the handover procedure, the UE 101 may be handed over to the target (R)AN 102_2 from the initial (R)AN 102_1 through a negotiation between the initial (R)AN 102_1 and the target (R)AN 102_2. Here, in an embodiment of the disclosure, with the handover procedure being performed, it is possible that the UE 101 finds out that the tracking area of the target (R)AN 102_2 is not shown in the TAI list stored by the UE when moving from one tracking area to another tracking area. Consequently, in response to a determination result that the tracking area of the target (R)AN 102_2 is not shown in the TAI list stored by the UE, the UE 101 further performs a mobility registration procedure.

Then, after the mobility registration procedure is triggered and performed, in step S702, the UE 101 transmits a registration request and access node parameters to the target (R)AN 102_1, and the registration request includes network slice selection assistance information (NSSAI). In step S703, the target (R)AN 102_2 performs an AMF selection. Afterwards, in step S704, the target (R)AN 102_2 transmits the registration request of the UE 101 to the initial AMF 104. In step S705, the initial AMF 104 determines whether having capability for serving the UE 101.

In the process example of FIG. 7, it is assumed that the initial AMF 104 confirms that the initial AMF 104 itself has the capability for serving the UE 101 in step S705. Under this premise, in step S706, the initial AMF 104 transmits a network function discovery request to the NRF 112, and the network function discovery request may the NSSAI and other registration related information. In step S707, the NRF 112 processes parameters in the registration request, and determines at least one candidate network function associated with at least one candidate network slice according to the NSSAI and the other registration information in the registration request. In step S708, the NRF 112 provides the candidate network function to the initial AMF 104 by transmitting a network function discovery response corresponding to the network function discovery request. In step S709, the initial AMF 104 selects one or more network functions for serving the UE 101 according to the network function discovery response. Nonetheless, detailed operations of steps S702 to S716 executed by the initial AMF 104 in FIG. 7 are similar to detailed operations of steps S401 to S415 executed by the initial AMF 104 in FIG. 4, which are not repeated hereinafter. With a slice selection performed by transmitting the NSSAI in a mobility registration request by the initial AMF 104 to the NRF 112, the UE 101 may complete selection/re-selection of the network slices through the mobility registration procedure.

Figure 8:
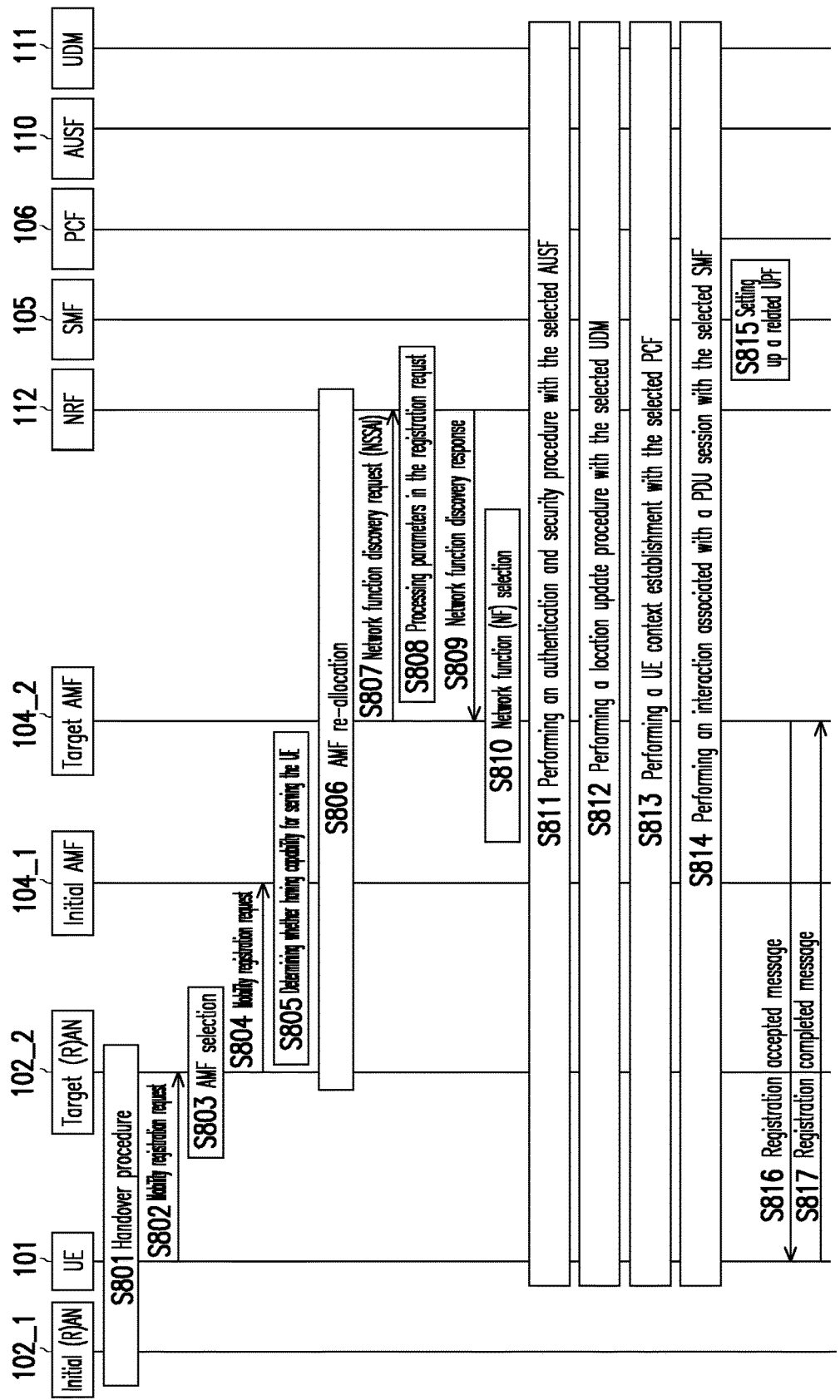
FIG. 8 is a schematic diagram illustrating the user equipment registration method related to a mobility registration according to an embodiment of the disclosure.

The situation involving the AMF re-allocation is described below with reference to other embodiments. FIG. 8 is a schematic diagram illustrating the user equipment registration method related to a mobility registration according to an embodiment of the disclosure. An exemplary example of FIG. 8 is described using the mobility registration procedure, but the disclosure is not limited thereto.

Step S801 to step S805 are similar to step S701 to step S705 shown in FIG. 7, and may be understood with reference to descriptions for FIG. 4 to FIG. 7. Unlike the embodiment of FIG. 7, in a process example of FIG. 8, it is assumed that the initial AMF 104_1 determines that the initial AMF 104_1 itself does not have the capability for serving the UE 101 in step S805. Under this premise, in step S806, an AMF re-allocation procedure may be performed for the target (R)_AN 102_2, the initial AMF 104_1, the target AMF 104_2 and the NRF 112 such that the mobility registration request of the UE 101 may be rerouted to the target AMF 104_2. Here, step S806 may be implemented by steps S505 to S508 shown in FIG. 5, or implemented by steps S605 to S610 shown FIG. 6, for example. After the registration request including the NSSAI is obtained by the target AMF 104_2, step S807 to step S817 are performed similarly as detailed operation of steps S706 to S716 executed by the initial AMF 104 in FIG. 7, which are not repeated hereinafter.

Figure 9:
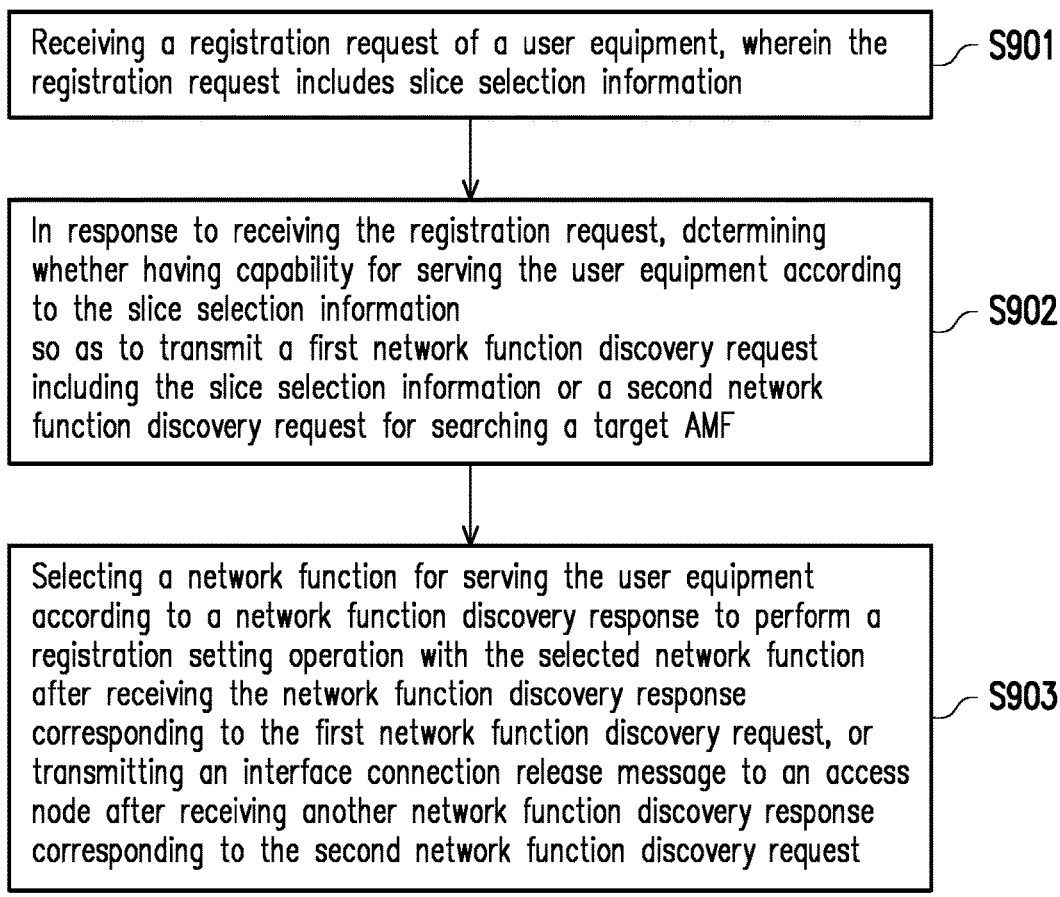
FIG. 9 is a flowchart illustrating the user equipment registration method according to an embodiment of the disclosure.

FIG. 9 is a flowchart illustrating the user equipment registration method according to an embodiment of the disclosure. Each of steps in FIG. 9 is executed by a network controller having an AMF. In step S901, a registration request of a user equipment is received, wherein the registration request includes slice selection information. In step S902, in response to receiving the registration request, whether having capability for serving the user equipment is determined according to the slice selection information so as to transmit a first network function discovery request including the slice selection information or a second network function discovery request for searching a target AMF. In step S903, a network function for serving the user equipment is selected according to a network function discovery response to perform a registration setting operation with the selected network function after receiving the network function discovery response corresponding to the first network function discovery request, or an interface connection release message is transmitted to an access node after receiving another network function discovery response corresponding to the second network function discovery request.

Figure 10:
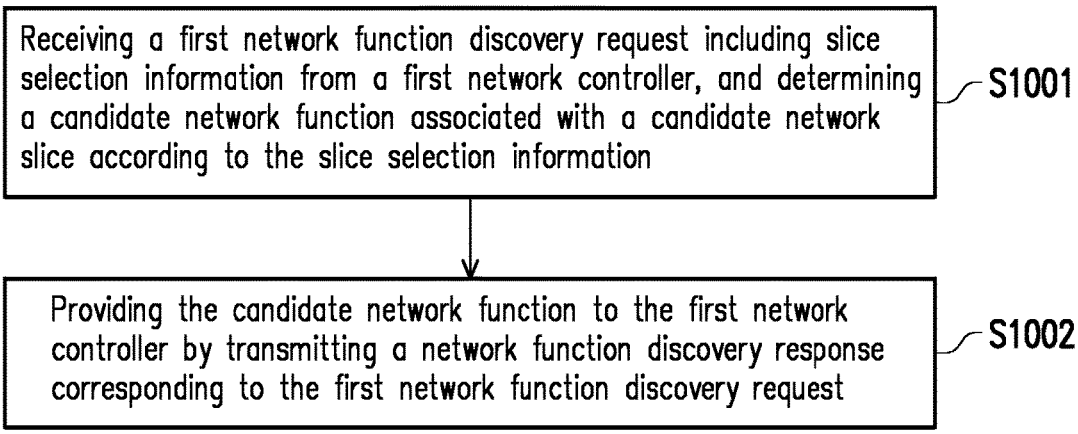
FIG. 10 is a flowchart illustrating the user equipment registration method according to an embodiment of the disclosure.

FIG. 10 is a flowchart illustrating the user equipment registration method according to an embodiment of the disclosure. Each of steps in FIG. 10 is executed by a network controller having a NRF. In step S1001, a first network function discovery request including the slice selection information is received from a first network controller, and a candidate network function associated with a candidate network slice is determined according to the slice selection information. In step S1002, the candidate network function is provided to the first network controller by transmitting a network function discovery response corresponding to the first network function discovery request. Here, the first network controller described in FIG. 10 is, for example, a network controller having an AMF.

Figure 11:
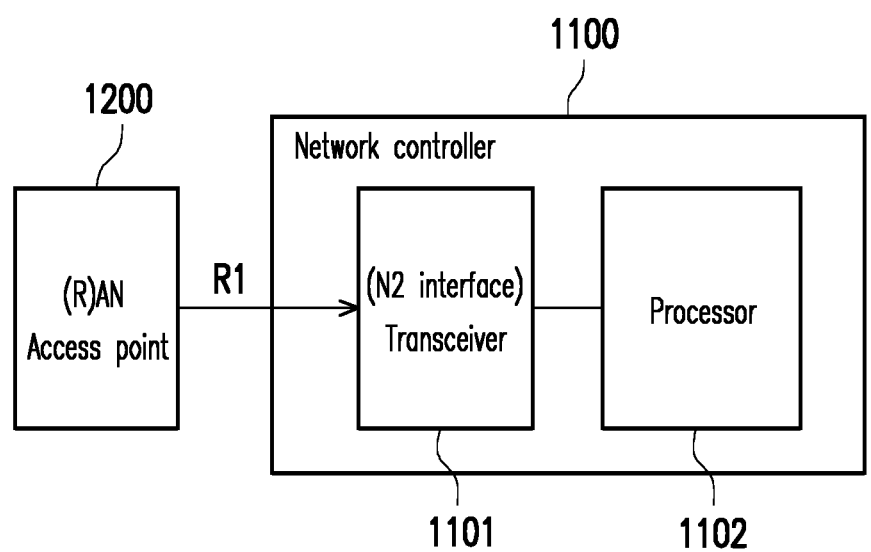
FIG. 11 is a block diagram illustrating a network controller according to an embodiment of the disclosure.

FIG. 11 is a block diagram illustrating a network controller according to an embodiment of the disclosure. A network controller 1100 may include, but not limited to, a processor 1102 and a transceiver 1101. The transceiver 1101 may include a receiver and a transmitter complied with an N2 interface definition for conducting a signal and data transmission with an access point 1200 of an (R)AN. For example, the network controller 1100 may receive a registration request R1 of a UE from the access point 1200 via the transceiver 1101. The processor 1102 is configured to execute the user equipment registration method disclosed according to FIG. 9 or FIG. 10 and/or related functions in all or part of foregoing embodiments. Functions of the processor 1102 may be realized by one or more programmable units and circuits having storage function such as a microprocessor, a micro controller, a DSP chip, FPGSA, etc. Functions of the processor 1102 may also be realized by different electronic equipments or ICs, and functions provided by the processor 1102 may be realized in hardware or software manner.

In summary, according to the embodiments of the disclosure, in the initial registration procedure or the mobility registration procedure, the AMF suitable for serving the UE may transmit the NSSAI in the registration request transmitted by the UE to the NRF. Correspondingly, the NRF may interact with the AMF through the network function discovery request and response, determine the network slice suitable for the UE according to the NSSAI in the registration request, and provide certain candidate network functions to the AMF. Accordingly, the AMF may select the network function for serving the UE according to the network function discovery response provided by the NRF such that the UE may be successfully connected to the suitable network slice through the registration procedure.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

The invention claimed is:

1. A user equipment registration method for network slice selection, adapted to a network controller having an access and mobility management function, and comprising:
receiving, by the access and mobility management function, a registration request of a user equipment, wherein the registration request comprises network slice selection assistance information (NSSAI);
in response to receiving the registration request, determining, by the access and mobility management function, whether the access and mobility management function has a capability for serving the user equipment according to the NSSAI so as to transmit a first network function discovery request including the NSSAI or a second network function discovery request for searching a target access and mobility management function; and
selecting, by the access and mobility management function, a network function for serving the user equipment according to a network function discovery response to perform a registration setting operation with the selected network function after the access and mobility management function receives the network function discovery response corresponding to the first network function discovery request, or transmitting an interface connection release message to an access node after the access and mobility management function receives another network function discovery response corresponding to the second network function discovery request.

2. The user equipment registration method for network slice selection according to claim 1, wherein the step of determining, by the access and mobility management function, whether the access and mobility management function has the capability for serving the user equipment according to the NSSAI so as to transmit the first network function discovery request including the NSSAI or the second network function discovery request for searching the target access and mobility management function comprises:
transmitting the first network function discovery request including the NSSAI to a network function repository function (NRF) if the access and mobility management function has the capability for serving the user equipment is determined.

3. The user equipment registration method for network slice selection according to claim 2, wherein the network function for serving the user equipment comprises an authentication server function (AUSF), and the step of performing the registration setting operation with the selected network function comprises: performing an authentication and security procedure associated with the user equipment with the selected AUSF.

4. The user equipment registration method for network slice selection according to claim 2, wherein the network function for serving the user equipment comprises a unified data management (UDM), and the step of performing the registration setting operation with the selected network function comprises: performing a location update procedure associated with the user equipment with the selected UDM.

5. The user equipment registration method for network slice selection according to claim 2, wherein the network function for serving the user equipment comprises a policy control function (PCF), and the step of performing the registration setting operation with the selected network function comprises: performing a UE context establishment with the selected PCF.

6. The user equipment registration method for network slice selection according to claim 2, wherein the network function for serving the user equipment comprises a session management function (SMF), and the step of performing the registration setting operation with the selected network function comprises: performing an interaction associated with a packet data unit (PDU) session with the selected SMF.

7. The user equipment registration method for network slice selection according to claim 1, wherein after the step of performing the registration setting operation with the selected network function, the user equipment registration method further comprises:
transmitting a registration accept message corresponding to the registration request; and
in response to transmitting the registration accept message, receiving a registration complete message transmitted by the user equipment.

8. The user equipment registration method for network slice selection according to claim 1, wherein the step of determining, by the access and mobility management function, whether the access and mobility management function has the capability for serving the user equipment according to the NSSAI so as to transmit the first network function discovery request including the NSSAI or the second network function discovery request for searching the target access and mobility management function comprises:

transmitting the second network function discovery request for searching the target access and mobility management function to a network function repository function if the access and mobility management function does not have the capability for serving the user equipment is determined.

9. The user equipment registration method for network slice selection according to claim 8, wherein the step of transmitting the interface connection release message to the access node after the access and mobility management function receives said another network function discovery response corresponding to the second network function discovery request comprises:
in response to receiving said another network function discovery response corresponding to the second network function discovery request, transmitting the interface connection release message and information regarding the target access and mobility management function to the access node in an access network, to trigger the access node to transmit the registration request including the NSSAI to the target access and mobility management function.

10. The user equipment registration method for network slice selection according to claim 8, wherein the step of transmitting the interface connection release message to the access node after the access and mobility management function receives said another network function discovery response corresponding to the second network function discovery request comprises:
in response to receiving said another network function discovery response corresponding to the second network function discovery request, forwarding the registration request including the NSSAI to the target access and mobility management function; and
transmitting the interface connection release message to the access node in an access network to trigger the access node to transmit an interface connection established message to the target access and mobility management function.

11. The user equipment registration method for network slice selection according to claim 1, wherein the registration request is generated based on an initial registration procedure performed by the user equipment.

12. The user equipment registration method for network slice selection according to claim 1, wherein the registration request is generated based on a mobility registration procedure performed by the user equipment.

13. A network controller, comprising:
a transceiver; and
a processor, coupled to the transceiver, and configured to:
receive, by an access and mobility management function, a registration request of a user equipment via the transceiver, wherein the registration request comprises network slice selection assistance information (NSSAI);
in response to receiving the registration request, determine by the access and mobility management function, whether the access and mobility management function has a capability for serving the user equipment according to the NSSAI so as to transmit a first network function discovery request including the NSSAI or a second network function discovery request for searching a target access and mobility management function; and
select, by the access and mobility management function, a network function for serving the user equipment according to a network function discovery response to perform a registration setting operation with the selected network function after the access and mobility management function receives the network function discovery response corresponding to the first network function discovery request, or transmit an interface connection release message to an access node after the access and mobility management function receives another network function discovery response corresponding to the second network function discovery request.

14. The network controller according to claim 13, wherein the processor is further configured to:
transmit the first network function discovery request including the NSSAI to a network function repository function if the access and mobility management function has the capability for serving the user equipment is determined.

15. The network controller according to claim 14, wherein the network function for serving the user equipment comprises an authentication server function (AUSF), and the processor is further configured to perform an authentication and security procedure associated with the user equipment with the selected AUSF.

16. The network controller according to claim 14, wherein the network function for serving the user equipment comprises a unified data management (UDM), and the processor is further configured to perform a location update procedure associated with the user equipment with the selected UDM.

17. The network controller according to claim 14, wherein the network function for serving the user equipment comprises a policy control function (PCF), and the processor is further configured to perform a UE context establishment with the selected PCF.

18. The network controller according to claim 14, wherein the network function for serving the user equipment comprises a session management function (SMF), and the processor is further configured to perform an interaction associated with a packet data unit (PDU) session with the selected SMF.

19. The network controller according to claim 13, wherein after the step of performing the registration setting operation with the selected network function, the processor is further configured to:
transmit a registration accept message corresponding to the registration request; and
in response to transmitting the registration accept message, receive a registration complete message transmitted by the user equipment.

20. The network controller according to claim 13, wherein the processor is further configured to:
transmit the second network function discovery request for searching the target access and mobility management function to a network function repository function if the access and mobility management function does not have the capability for serving the user equipment is determined.

21. The network controller according to claim 20, wherein the processor is further configured to:
in response to receiving the another network function discovery response corresponding to the second network function discovery request, transmit the interface connection release message and information regarding the target access and mobility management function to the access node in an access network, to trigger the access node to transmit the registration request including the NSSAI to the target access and mobility management function.

22. The network controller according to claim 20, wherein the processor is further configured to:
- in response to receiving the another network function discovery response corresponding to the second network function discovery request, forward the registration request including the NSSAI to the target access and mobility management function; and
- transmit the interface connection release message to the access node in an access network to trigger the access node to transmit an interface connection established message to the target access and mobility management function.

23. The network controller according to claim 13, wherein the registration request is generated based on an initial registration procedure performed by the user equipment.

24. The network controller according to claim 13, wherein the registration request is generated based on a mobility registration procedure performed by the user equipment.

25. A network communication system, comprising:
- a first network controller; and
- a second network controller, connected to the first network controller,
- wherein the first network controller receives, by an access and mobility management function, a registration request of a user equipment, wherein the registration request comprises network slice selection assistance information (NSSAI);
- in response to receiving the registration request, the first network controller determines, by the access and mobility management function, whether the access and mobility management function has a capability for serving the user equipment according to the NSSAI, so as to transmit a first network function discovery request including the NSSAI;
- the second network controller receives a first network function discovery request including the NSSAI, and determines a candidate network function associated with a candidate network slice according to the NSSAI;
- the second network controller provides the candidate network function to the first network controller by transmitting a network function discovery response corresponding to the first network function discovery request; and
- the first network controller selects a network function for serving the user equipment according to the network function discovery response to perform a registration setting operation with the selected network function after the network function discovery response corresponding to the first network function discovery request is received by the first network function controller.

* * * * *